United States Patent Office 3,338,873
Patented Aug. 29, 1967

3,338,873
POLYMERIZING EPOXIDES WITH FERRIC HALIDE - PROPYLENE OXIDE CONDENSATE CATALYST ADMIXED WITH AN ORGANIC POLYISOCYANATE
Arthur E. Gurgiolo, Lake Jackson, Tex., assignor to The Dow Chemical Company, Midland, Mich., a corporation of Delaware
No Drawing. Filed Nov. 29, 1963, Ser. No. 327,073
9 Claims. (Cl. 260—77.5)

This invention relates to the polymerization of epoxides and pertains especially to improvements in a process for polymerizing epoxides in contact with a complex catalyst condensate of propylene oxide and a ferric halide, e.g. ferric chloride.

It is known to prepare solid polymers of propylene oxide or epichlorohydrin by contacting the same with a complex catalyst condensate of ferric chloride and propylene oxide, and methods of making the catalyst condensates are known.

It has now been discovered that a polymer of substantially greater molecular weight can readily be obtained by carrying out the polymerization of an epoxy compound, or a mixture of two or more epoxides, in contact with a complex catalyst condensate of a ferric halide and propylene oxide in admixture with a small but efffective proportion within the range of from about 1 to 20, preferably from 2 to 15 percent by weight of an organic isocyanate as more fully hereinafter described.

The isocyanate to be employed can be any mono- or poly- organic isocyanate such as phenyl isocyanate, phenyl isothiocyanate, hexamethylene diisocyanate, butyl isocyanate, tolylene diisocyanate, naphthalene diisocyanate, tri(p-isocyanylphenyl)methane, diphenylmethane-4,4'-diisocyanate, 3,3'-dimethyldiphenylmethane-4,4'-diisocyanate, meta-phenylenediisocyanate, 2,4-tolylene diisocyanate dimer, polymethylene polyphenylisocyanate, triphenyl methane trimer, or dianisidine diisocyanate, or mixtures of any two or more of such isocyanates. The tolylene diisocyanates are preferred, e.g. 2,4-tolylene diisocyanate or mixtures of 2,4- and 2,6-tolylene diisocyanate, which usually range from about 20–35 percent by weight of 2,6-tolylene diisocyanate and from 80–65 percent 2,4-tolylene diisocyanate.

The epoxides can be an alkylene oxide having from two to four carbon atoms or a halogen substituted alkylene oxide or an aliphatic glycidyl ether containing an oxirane group, but is preferably an alkylene oxide, or consists of at least a major proportion by weight of one or more alkylene oxides and not more than a minor proportion of another epoxide containing aromatic or carbocyclic nuclei in the molecule. Examples of suitable epoxides are ethylene oxide, propylene oxide, butylene oxide, epichlorohydrin, epibromohydrin, allyl glycidyl ether, methallyl glycidyl ether, and butyl glycidyl ether. Mixtures of any two or more of such aliphatic epoxides can be used, or mixtures of a major proportion by weight of one or more of such aliphatic epoxides and a minor proportion of an epoxy resin such as diglycidyl ethers of bisphenols, or cycloaliphatic epoxy resins such as 3,4-epoxy - 6 - methylcyclohexyl - 3,4 - epoxy-6-methylcyclohexane carboxylate.

The complex catalyst condensate can be employed in proportions corresponding to from about 1 to about 20 percent, preferably from about 1 to 10 percent by weight of the epoxide, or the sum of the weights of the epoxides used.

The polymerization reaction can be carried out at temperatures of from about 60° to 120° C., preferably from 70° to 110° C., and at pressures at least as great as the autogeneous pressure of the mixture of the materials. Higher pressures can be used but are not required in the process.

In practice, the catalyst, together with an organic isocyanate such as tolylene diisocyanate, is placed in a pressure resistant vessel or autoclave. The epoxide, e.g. propylene oxide or a mixture of at least 50 percent by weight of propylene oxide and not more than 50 percent by weight of another epoxide such as allyl glycidyl ether, glycidyl ether, or butyl glycidyl ether, is added. The resulting mixture is heated and stirred, or otherwise agitated, at temperatures between about 60° and 120° C. until all, or a substantial proportion of the epoxide starting materials have been polymerized. Polymerization of the epoxide is often complete or substantially complete at temperatures of 80–90° C. in a period of 3 to 4 hours or longer.

The polymer is recovered and is separated from volatile ingredients e.g. unreacted volatile epoxide, by heating in vacuum or under reduced pressure. The polymer may be further purified by dissolving the same in a solvent, e.g. acetone or methyl ethyl ketone, adding a small amount of concentrated hydrochloric acid solution thereto to dissolve the catalyst residue, then cooling the resultant solution to precipitate the polymer, which latter is separated by filtering and is washed and dried.

The following examples illustrate ways in which the principle of the invention has been applied, but are not to be construed as limiting its scope.

*Example 1*

A charge of 250 grams of anhydrous ferric chloride was placed in a glass reaction vessel equipped with a stirrer and reflux condenser and suspended in 1.5 liters of carbon tetrachloride. The mixture was stirred and maintained at temperatures between 25° and 35° C. while adding thereto dropwise over a period of about 60 minutes, a charge of 360 grams of propylene oxide. Thereafter, 1.5 liters of normal hexane was added. The mixture was stirred while adding dropwise a charge of a mixture of 41.6 grams of water and 400 ml. of propylene oxide over a period of 1.5 hours. A precipitate was formed. The precipitate was separated by filtering and was washed with liquid propylene oxide, then was dried under vacuum. There was obtained 250 grams of dried solid material consisting of a complex of the ferric chloride and the propylene oxide. It was a catalyst for the polymerization of propylene oxide.

*Example 2*

In each of a series of experiments a charge of 95.4 grams of propylene oxide 4.6 grams of tolylene diisocyanate and an amount as stated in the following table of the ferric chloride-propylene oxide complex prepared in Example 1, as catalyst, was sealed in a pressure resistant glass bottle and was heated at a temperature of 80° C. for a period of 18 hours, with agitating. Thereafter, the polymer was recovered. A portion of the polymer was compression molded at 320° F. under 3000 p.s.i. gauge pressure for 10 minutes to form a sheet 0.05 inch thick. Test pieces were cut from the sheet and were used to determine the tensile strength of the polymer. Table I identifies the experiments and gives the yield of polymer based on the propylene oxide initially used. The table also gives the tensile strength of the polymer. For purpose of comparison, propylene oxide was polymerized with the catalyst material under similar conditions but in the absence of tolylene diisocyanate, and the results reported in the table as Run No. 5.

TABLE I

| Run No. | Catalyst, Percent | Tolylene Diisocyanate, gms. | Polymer | |
|---|---|---|---|---|
| | | | Yield, Percent | Tensile Strength, lbs./sq. in. |
| 1 | 2 | 4.6 | 28.2 | 1,635 |
| 2 | 3 | 4.6 | 37.3 | 1,641 |
| 3 | 4 | 4.6 | 52.4 | 1,330 |
| 4 | 5 | 4.6 | 63.9 | 1,250 |
| 5 | 5 | 0 | 87.3 | 221 |

Example 3

In each of a series of experiments, a charge of 95 grams of propylene oxide, 4 grams of the ferric chloride-propylene oxide catalyst prepared in Example 1, and 5 grams of tolylene diisocyanate were sealed in a glass bottle and heated at a temperature of 90° C. for a period of time as stated in the following table. Table II identifies the experiments, gives the yield of polymer, based on the starting material, and the tensile strength for molded test pieces of the polypropylene oxide. The table also shows the results obtained when the polymerization is carried out in the absence of tolylene diisocyanate.

TABLE II

| Run No. | Catalyst, Percent | Tolylene Diisocyanate, gms. | Time, hrs. | Polymer | |
|---|---|---|---|---|---|
| | | | | Yield, Percent | Tensile Strength, lbs./sq. in. |
| 1 | 4 | 5 | 12 | 50.2 | 1,154 |
| 2 | 4 | 5 | 18 | 61.3 | 928 |
| 3 | 4 | 5 | 24 | 69.6 | 855 |
| 4 | 4 | 5 | 36 | 80.6 | 650 |
| 5 | 4 | 5 | 48 | 85.2 | 644 |
| 6 | 4 | 5 | 72 | 97.3 | 644 |
| 7 | 4 | 0 | 18 | 70.5 | 228 |

Example 4

In each of a series of experiments, a charge of 95 grams of epichlorohydrin, 5 grams of tolylene diisocyanate and an amount of a ferric chloride propylene oxide complex condensate catalyst, prepared by procedure similar to that employed in Example 1, as stated in the following table was sealed in a glass bottle and was heated at a temperature of 80° C. for a period of 88 hours. Thereafter, the crude polymer was recovered. The characteristics and yield of isotactic polymer was obtained by dissolving 25 grams of the crude polymer (19 grams in Run No. 1) in 200 cc. of hot 1,4-dioxane. 2 cc. of concentrated HCl was then added to dissolve the iron catalyst. This solution was poured into 800 cc. of methanol while being agitated. The isotactic polymer which precipitated was filtered, washed with methanol and dried. Table III identifies the experiments and gives the weight in grams of ferric chloride complex catalyst employed per 100 grams of starting materials. The table also gives the conversion of crude polymer based on the starting materials, the yield of isotactic polymer as percent of crude polymer, the percent by weight of chlorine in the crude polymer, a reduced viscosity characteristic of the isotactic polymer as determined for a 0.2 weight percent solution of the polymer in dioxane at 30° C., and a molecular weight value for the isotactic polymer. "Reduced viscosity" is defined in U.S. Patent No. 3,031,439, columns 1 and 2, lines 60–70 and 1–6 respectively.

TABLE III

| Run No. | Catalyst, grams | Crude Polymer | | Isotactic Polymer | | |
|---|---|---|---|---|---|---|
| | | Conversion, percent | Cl, percent | Polymer, percent | Reduced Viscosity | Molecular Weight |
| 1 | 1 | 19.0 | 27.5 | 44.6 | 2.60 | 490,000 |
| 2 | 2 | 36.4 | 32.2 | 47.6 | 2.71 | 520,000 |
| 3 | 3 | 46.8 | 33.3 | 47.5 | 2.50 | 465,000 |
| 4 | 4 | 57.7 | 34.0 | 43.0 | 2.25 | 400,000 |
| 5 | 5 | 56.4 | 34.0 | 47.5 | 1.86 | 310,000 |
| 6 | 6 | 65.0 | 34.4 | 43.2 | 1.75 | 285,000 |
| 7 | 4 | 42.5 | | 49.8 | 1.09 | 145,000 |

Example 5

A charge of 93 grams of ethylene oxide and 7 grams of phenyl isocyanate, together with 1 gram of ferric chloride-propylene oxide complex similar to that prepared in Example 1, as catalyst, was placed in a glass bottle and heated with agitating at a temperature of 80° C. for a period of 24 hours. There was obtained 73 grams of polymer as a hard, brown, waxy, solid. It was soluble in water. The crude product was dissolved in warm acetone and sufficient concentrated aqueous hydrochloric acid solution was added to convert the iron-complex catalyst residue to soluble ferric chloride. The resulting solution was cooled to −20° C. whereupon a solid polymer precipitated. It was separated by filtering. This polymer was recrystallized twice from acetone. There was obtained 44 grams of polymer as a fluffy white solid. The purified polymer had a reduced viscosity of 1.60 as determined for a 0.2 weight percent solution of the polymer in dioxane at 30° C.

Example 6

A charge of 95 grams of ethylene oxide and 5 grams of toluene diisocyanate, together with 1 gram of ferric chloride-propylene oxide complex as catalyst was polymerized by heating the same in a closed glass container at 80° C. for a period of 24 hours. There was obtained 60 grams of a hard, brown, waxy, solid that was soluble in water. It was purified by procedure similar to that employed in Example 5. There was obtained 36 grams of product as a white fluffy solid. The product had a reduced viscosity of 1.28.

Example 7

A charge of 90 grams of ethylene oxide and 10 grams of toluene diisocyanate was polymerized, the polymer separated and purified employing procedures similar to those employed in Example 5. There was obtained 37 grams of polymerized ethylene oxide as a white fluffy solid having a reduced viscosity of 1.39.

For purpose of comparison, a charge of 100 grams of ethylene oxide was polymerized, the polymer separated and purified employing procedure similar to those employed in Example 7. There was obtained 30 grams of polymerized ethylene oxide as a white fluffy solid having a reduced viscosity of 0.74.

Example 8

A charge of 155 grams of propylene oxide, 20 grams of toluene diisocyanate and 25 grams of an epoxy resin consisting essentially of diglycidyl ether of bis(4-hydroxyphenyl)dimethylmethane having a viscosity of about 14,000 centipoises and an epoxy equivalent weight of about 190, together with 8 grams of a ferric chloride-propylene oxide complex similar to that prepared in Example 1, as catalyst, was heated in a sealed glass bottle at 80° C. for a period of 48 hours to polymerize the reactants. There was obtained 174 grams of a hard, brown, non-tacky, non-rubbery solid product. It was insoluble in dioxane and in dimethylformamide. A portion of the polymer was compression molded at 320° F. under 3000 p.s.i. gauge pressure for 10 minutes to form a sheet 0.05 inch thick. Test pieces were cut from the molded sheet and were used to determine the tensile strength of 515 pounds per square inch.

For purpose of comparison, a charge of 175 grams of propylene oxide and 25 grams of an epoxy resin consisting essentially of diglycidyl ether of bisphenol A having a viscosity of about 14,000 centipoises and an epoxy equivalent weight of about 190, together with 8 grams of a ferric chloride-propylene oxide complex similar to that prepared in Example 1, as catalyst, was heated in a sealed glass bottle at 80° C. for a period of 48 hours to polymerize the reactants. There was obtained 198.7 grams of a hard, brown, non-tacky, non-rubbery solid product. It was insoluble in dioxane and in dimethylformamide. A portion of the polymer product was compression molded at 320° F. under 3000 p.s.i. gauge pressure for 10 minutes to form a sheet 0.05 inch thick. Test pieces were cut from the molded sheet and were used to determine the tensile strength of the polymer. The product had a tensile strength of less than 10 pounds per square inch.

Example 9

A charge of 180 grams of butylene oxide and 20 grams of toluene diisocyanate, together with 8 grams of ferric chloride-propylene oxide complex as catalyst, was polymerized by heating the same in a closed glass vessel at a temperature of 80° C. for a period of 48 hours. There was obtained 49.8 grams of a brown, non-tacky, rubbery polymer. The polymer had a reduced viscosity of 1.512 as determined for 0.5 percent weight percent solution of the polymer in dioxane at 30° C.

For purpose of comparison, a charge of 200 grams of butylene oxide together with 8 grams of ferric chloride-propylene oxide complex as catalyst, was polymerized by heating the same in a closed glass vessel at a temperature of 80° C. for a period of 48 hours. There was obtained 129.8 grams of a brown, very tacky, highly viscous solid polymer. The polymer had a reduced viscosity of 0.99 as determined for a 0.5 percent weight percent solution of the polymer in dioxane at 30° C.

Example 10

A charge of 160 grams of propylene oxide, 20 grams of toluene diisocyanate and 20 grams of styrene oxide, together with 8 grams of ferric chloride-propylene oxide complex as catalyst, was heated in a sealed glass vessel at 80° C. for a period of 48 hours. There was obtained 133.5 grams of a hard, brown, non-tacky, non-rubbery polymer. A portion of the product was compression molded at 320° F. and 3000 p.s.i. gauge pressure for 10 minutes. The molded polymer had a tensile strength of 195 pounds per square inch.

For purpose of comparison, a charge of 180 grams of propylene oxide and 20 grams of styrene oxide, together with 8 grams of ferric chloride-propylene oxide complex as catalyst, was heated in a sealed glass vessel at 80° C. for a period of 48 hours. There was obtained 165 grams of a firm, brown, slightly tacky, rubbery polymer. A portion of the product was compression molded at 320° F. and 3000 p.s.i. gauge pressure for 10 minutes. The molded polymer had a tensile strength of less than 10 pounds per square inch.

Example 11

A charge of 186 grams of propylene oxide and 14 grams of hexamethylene diisocyanate, together with 8 grams of a ferric chloride-propylene oxide complex as catalyst, was heated at 80° C. in a sealed glass vessel for 48 hours. There was obtained 196.5 grams of a hard, brown, non-rubbery polymer. The polymer had a reduced viscosity of 1.724 as determined for a 0.5 weight percent solution of the polymer in dioxane at 30° C.

For purpose of comparison, a charge of 200 grams of propylene oxide with 8 grams of a ferric chloridepropylene oxide complex as catalyst was heated at 80° C. in a sealed glass vessel for 48 hours. There was obtained 208 grams of a slightly tacky, brown, rubbery solid polymer. The polymer had a reduced viscosity of 0.99 as determined for a 0.5 weight percent solution of the polymer in dioxane at 30° C.

Example 12

In each of a series of experiments, a charge of 12 grams of allyl glycidyl ether together with 8 grams of a ferric chloride-propylene oxide complex, similar to that prepared in Example 1 as catalyst, and propylene oxide and butyl isocyanate in amounts as stated in the following table, were sealed in a glass vessel and heated at a temperature of 80° C. for a period of 48 hours to form a polymeric product. The polymer was compounded with other ingredients employing the recipe:

| Ingredients: | Parts by weight |
|---|---|
| Polymer | 100 |
| Phenyl beta-napthylamine | 2 |
| Stearic acid | 2 |
| Zinc oxide | 10 |
| Carbon black | 35 |
| Sulfur | 5 |
| Tetramethyl thiuram disulfide | 2 |
| 2-mercaptobenzothiazole | 2 |

The ingredients were compounded or blended with the polymer on a pair of water-cooled laboratory rolls by banding the polymer on the rolls, then adding the phenyl beta-naphthylamine, the stearic acid and the zinc oxide, followed by the adding of the carbon black. After blending these ingredients there was added the sulfur, the tetramethyl thiuram disulfide and the 2-mercaptobenzothiazole. The resulting mixture was blended for 5 minutes on the rolls, then was sheeted out and removed and was allowed to cool to room temperature and was cut to a granular form. A portion of the blended product was heated in a 4 x 5 inch rectangular window mold under 3,000 pounds per square inch gauge ram pressure at 320° C. for 40 minutes to cure or vulcanize the product and form a sheet 0.065 inch thick. Test pieces were cut from the molded and cured sheet and were used to determine a tensile strength value for the vulcanized product. Other portions of the polymer product were tested to determine a reduced viscosity characteristic for the polymer as determined for a 0.5 weight percent solution of the polymer in dioxane at 30° C. Table IV identifies the experiments and gives the parts by weight of the propylene oxide, the allyl glycidyl ether and the butyl isocyanate employed in making the same. The table also gives the weight of polymer obtained and its reduced viscosity. The table gives the tensile strength for the cured or vulcanized rubber product. For purpose of comparison, a copolymer was prepared in the absence of butyl isocyanate and the results reported in the table as Run No. 1.

TABLE IV

| Run No. | Starting Materials | | | Polymer | | Vulcanized Polymer, Tensile Strength, lbs/sq. in. |
|---|---|---|---|---|---|---|
| | Propylene Oxide, gms. | Allyl Glycidyl Ether, gms. | Butyl Isocyanate, gms. | Wt., gms. | Reduced Viscosity | |
| 1 | 188 | 12 | 0 | 208.2 | 0.752 | 1,400 |
| 2 | 186 | 12 | 2 | 171.8 | 1.300 | 1,740 |
| 4 | 184 | 12 | 4 | 162.6 | 1.320 | 1,617 |
| 5 | 180 | 12 | 8 | 188.6 | 1.240 | 2,031 |
| 5 | 178 | 12 | 10 | 187.3 | 1.452 | 2,114 |
| 6 | 172 | 12 | 16 | 189.0 | 1.512 | 2,334 |
| 7 | 168 | 12 | 20 | 184.4 | 1.320 | 2,488 |

*Example 13*

In each of a series of experiments, a charge of 12 grams of allyl glycidyl ether, together with 8 grams of a ferric chloride-propylene oxide complex as catalyst, and propylene oxide and phenyl isocyanate, in amounts as stated in the following table was sealed in a glass vessel and heated at 80° C. for 48 hours to polymerize said ingredients. A portion of the polymer was used to determine a reduced viscosity characteristic as a 0.5 weight percent solution in dioxane at 30° C. Table V identifies the experiments, gives the proportion in parts by weight of the starting materials used to prepare the polymers. The table also gives weight of polymer obtained and a reduced viscosity characteristic determined for the polymer.

TABLE V

| Run No. | Starting Material | | | Polymer | |
|---|---|---|---|---|---|
| | Propylene Oxide, gms. | Allyl Glycidyl Ether, gms. | Phenyl Isocyanate, gms. | Gms. | Reduced Viscosity |
| 1 | 184 | 12 | 4 | 176.5 | 1.400 |
| 2 | 178 | 12 | 10 | 171.0 | 1.648 |
| 3 | 172 | 12 | 16 | 184.1 | 1.440 |
| 4 | 168 | 12 | 20 | 163.8 | 1.660 |
| 5 | 188 | 12 | 0 | 208.2 | 0.752 |

*Example 14*

In each of a series of experiments, a charge of 12 grams of allyl glycidyl ether, together with 8 grams of a ferric chloride-propylene oxide complex as catalyst, and propylene oxide and phenyl isothiocyanate in proportions as stated in the following table were sealed in a glass vessel and heated at 80° C. for 48 hours to polymerize the ingredients. Table VI identifies the experiments and gives the results obtained.

TABLE VI

| Run No. | Starting Materials | | | Polymer | |
|---|---|---|---|---|---|
| | Propylene Oxide, gms. | Allyl Glycidyl Ether, gms. | Phenyl Isothiocyanate, gms. | Wt., gms. | Reduced Viscosity |
| 1 | 184 | 12 | 4 | 205.4 | 1.210 |
| 2 | 178 | 12 | 10 | 191.9 | 1.272 |
| 3 | 172 | 12 | 16 | 190.3 | 1.180 |
| 4 | 168 | 12 | 20 | 174.4 | 1.160 |
| 5 | 188 | 12 | 0 | 208.2 | 0.752 |

I claim:

1. In a process for making a polymeric composition comprised of at least a predominant amount by weight of at least one polymerized aliphatic epoxy compound selected from the group consisting of (a) 1,2-alkylene oxides having from 2 to 4 carbon atoms and (b) epichlorohydrin and not more than a minor proportion by weight of another epoxy compound selected from the group consisting of (1) styrene oxide, (2) allyl glycidyl ether, and (3) diglycidyl ether of bis(4-hydroxyphenyl)dimethyl methane by polymerization of said epoxy compounds in contact with a complex catalyst condensate of a ferric halide and propylene oxide, the improvement which consists in carrying out the polymerization in admixture with an isocyanate selected from the group consisting of (A) organic isocyanates and (B) organic isothiocyanates in amount between 1 and 20 percent by weight of the sum of the weights of the epoxy compounds.

2. A process as claimed in claim 1, wherein the ferric halide is ferric chloride.

3. A process for making a polymeric composition comprised of at least 50 percent by weight of at least one polymerized aliphatic epoxy compound selected from the group consisting of (a) 1,2-alkylene oxides having from 2 to 4 carbon atoms in the molecule, and (b) epichlorohydrin and not more than 50 percent by weight of another epoxy compound selected from the group consisting of (1) styrene oxide, (2) allyl glycidyl ether and (3) diglycidyl ether of bis(4-hydroxyphenyl)dimethyl methane which process comprises contacting said epoxy compounds with one another and a complex catalyst condensate of ferric chloride and propylene oxide in admixture with from about 2 to 15 percent by weight of an organic isocyanate based on the sum of the weights of the epoxy compounds initially used, at reaction temperatures between about 60° and 120° C. and separating polymer from the reacted mixture.

4. A process for making solid homopolymeric propylene oxide which comprises contacting propylene oxide with a complex catalyst condensate of ferric chloride and propylene oxide in admixture with from about 2 to about 15 percent by weight of an organic isocyanate, based on the weight of the propylene oxide starting material, at reaction temperatures between about 60° and 120° C., and separating polymer from the reacted product.

5. A process as claimed in claim 4, wherein the isocyanate is tolylene diisocyanate.

6. A process for making a solid copolymer of propylene oxide and allyl glycidyl ether, containing in chemically combined form a predominant amount by weight of polymerized propylene oxide, which process comprises contacting propylene oxide and allyl glycidyl ether in proportions corresponding to at least 50 percent by weight of propylene oxide with a complex catalyst condensate of ferric chloride and propylene oxide, and in admixture with from about 2 to 15 percent by weight of an organic isocyanate, based on the sum of the weights of the epoxy starting materials, at reaction temperatures between about 60° and 120° C. and separating copolymer from the reacted materials.

7. A process as claimed in claim 6 wherein the isocyanate is tolylene diisocyanate.

8. A process for making solid homopolymeric propylene oxide which comprises contacting propylene oxide with a complex catalyst condensate of ferric chloride and propylene oxide in admixture with from about 2 to about 15 percent by weight of phenyl isocyanate, based on the weight of the propylene oxide starting material, at reaction temperatures between about 60° and 120° C., and separating polymer from the reacted product.

9. A process for making a solid copolymer of propylene oxide and allyl glycidyl ether, containing in chemically combined form a predominant amount by weight of polymerized propylene oxide, which process comprises contacting propylene oxide and allyl glycidyl ether in proportions corresponding to at least 50 percent by weight of propylene oxide with a complex catalyst condensate of ferric chloride and propylene oxide, and in admixture with from about 2 to 15 percent by weight of butyl isocyanate, based on the sum of the weights of the epoxy starting materials, at reaction temperatures between about 60° and 120° C., and separating copolymer from the reacted materials.

References Cited

UNITED STATES PATENTS

| | | | |
|---|---|---|---|
| 2,706,181 | 4/1955 | Pruitt et al. | 260—2 |
| 2,970,984 | 2/1961 | D'Alelio | 260—47 |

WILLIAM H. SHORT, *Primary Examiner.*

T. E. PERTILLA, *Assistant Examiner.*